United States Patent [19]

Umeda et al.

[11] Patent Number: 4,783,149
[45] Date of Patent: Nov. 8, 1988

[54] TIME-SHARING DRIVE LIQUID CRYSTAL OPTICAL SWITCH ARRAY AND OPTICAL PRINTER USING THIS OPTICAL SWITCH ARRAY

[75] Inventors: Takao Umeda, Mito; Tetsuya Nagata; Yuzuru Simazaki, both of Hitachi; Tatsuo Igawa, Kitaibaraki; Yasuro Hori, Katsuta, all of Japan

[73] Assignee: Hitachi, Ltd., Tokyo, Japan

[21] Appl. No.: 916,724

[22] Filed: Oct. 8, 1986

[30] Foreign Application Priority Data

Oct. 9, 1985 [JP] Japan .................. 60-223581

[51] Int. Cl.$^4$ .................................. G02F 1/13
[52] U.S. Cl. ...................... 350/350 S; 350/331 R; 350/332; 350/339 R; 350/342
[58] Field of Search ............... 350/339 R, 342, 350 S, 350/332, 331 R

[56] References Cited

U.S. PATENT DOCUMENTS

| | | | |
|---|---|---|---|
| 4,448,491 | 5/1984 | Okubo | 350/339 R X |
| 4,548,476 | 10/1986 | Kaneko | 350/350 S |
| 4,634,226 | 1/1987 | Isogai et al. | 350/350 S X |
| 4,653,859 | 3/1987 | Masaki | 350/336 X |

FOREIGN PATENT DOCUMENTS

| | | |
|---|---|---|
| 56-70530 | 6/1981 | Japan .................. 350/342 |
| 59-193427 | 11/1984 | Japan . |
| 60-50556 | 3/1985 | Japan . |

Primary Examiner—John S. Heyman
Assistant Examiner—Richard Gallivan
Attorney, Agent, or Firm—Antonelli, Terry Wands

[57] ABSTRACT

The invention relates to a liquid crystal optical switch array in which optical switch elements are opened and closed by the time-sharing drive and to an optical printer using this optical switch array. The optical switch element comprises a ferroelectric liquid crystal having a relaxative memory effect, signal electrodes and scanning electrodes which sandwich the liquid crystal layer, and a resistor element which is formed between the scanning electrode and the liquid crystal. A line selection signal is sequentially supplied to the scanning electrodes, these scanning electrodes become substantially the open state when the selection signal is not supplied. When the scanning electrodes are open, the resistor element has a predetermined resistance value. When the selection signal is supplied to the scanning electrodes, the resistor element has a lower resistance value.

14 Claims, 12 Drawing Sheets

(a)

(b)

TIME-SHARING DRIVE LIQUID CRYSTAL OPTICAL SWITCH ARRAY AND OPTICAL PRINTER USING THIS OPTICAL SWITCH ARRAY

BACKGROUND OF THE INVENTION

The present invention relates to a time-sharing drive optical switch array using a ferroelectric liquid crystal and an optical printer using this optical switch array as a print head.

Different from a conventional nematic liquid crystal, the ferroelectric liquid crystal responds to a DC voltage and its response speed is extremely high and is below 1 msec. An optical switch using such a high response speed can be applied to high-speed printer head and display. In the case of driving the optical switch by a static driving method, the same number of drivers and electrodes as the number of the optical switch elements are necessary. Even if the number of optical switch elements increases, a time-sharing driving method can be used as a method for prevention of an increase in the number of drivers. According to the time-sharing driving method, a plurality of signal electrodes and a plurality of scanning electrodes are combined and the optical switch elements arranged at the cross points between the signal electrodes and the scanning electrodes are time-sharingly driven. This method is disclosed in, for example, U.S. Pat. No. 4,548,476 by Kaneko, issued on Oct. 22, 1985. The invention by Kaneko is characterized in that the polarity of the voltage to be applied to the optical switch elements selected through the scanning electrodes and signal electrodes and the polarity of the voltage to be applied to the other optical switch elements are opposite.

In this driving method, all of the optical switch elements arranged on the scanning electrodes which are not selected are fixed to the light shut-off state, so that only the optical switch elements disposed on the scanning electrodes selected by being applied with the selection signals can transmit the light. Therefore, if this driving method is used for the optical printer head, with an increase in the number of time divisions, the operating period of each optical switch element is reduced and the effective light irradiation energy which can be received on the photo reception side decreases. Therefore, the use efficiency of the light source deteriorates and the printing speed is becomes slow, so that the advantageous feature of the ferroelectric liquid crystal having a high response speed is not effectively used.

The time-sharing driving method of the ferroelectric liquid crystal is also disclosed in JP-A No. 59-193427 filed on Apr. 19, 1983 by Canon Inc. Although this method uses the threshold characteristic of the drive voltage of the ferroelectric liquid crystal, in order to realize the threshold value, the thickness of the liquid crystal layer needs to be controlled to about 1 μm. Therefore, the mass production of such a ferroelectric liquid crystal is, in fact, impossible according to the current manufacturing technology.

SUMMARY OF THE INVENTION

It is an object of the present invention to provide an optical switch array using a ferroelectric liquid crystal and, more particularly, to provide a time-sharing drive optical switch array of such a type which can raise the use efficiency of a light source by use of the function of a relaxative memory effect and can be driven at a high speed.

Another object of the invention is to provide an optical printer which uses a time-sharing drive optical switch array using a ferroelectric liquid crystal and which can print at a high speed.

To accomplish the above objects, a time-sharing drive optical switch array according to the present invention is constituted by arranging a plurality of optical shutter units in a line, and the optical shutter unit comprises:

n (n=2, 3, 4, . . .) optical shutter elements consisting of a ferroelectric liquid crystal;

a signal electrode which is commonly connected to each of the optical shutter elements of the optical shutter unit;

n scanning electrodes which are commonly connected to each one of the optical shutter elements of each of the optical shutter units, in which the optical shutter element is arranged at a position where the signal electrode and the scanning electrode cross each other so as to be sandwiched by both of the signal and scanning electrodes, a selection signal is sequentially supplied to each of the n scanning electrodes, the optical shutter elements connected to the scanning electrodes supplied with the selection signal transmit the light when a first predetermined potential is applied to the signal electrodes corresponding to those optical shutter elements, and those optical shutter elements shut off the light when a second predetermined potential is applied, while the scanning electrodes to which the selection signal is not supplied become substantially the open state; and resistor means which is connected between the scanning electrode and the optical shutter element when the selection signal is not supplied to the scanning electrodes.

Figure 8:
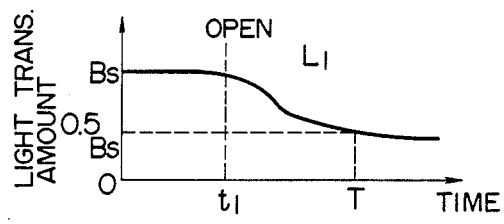
Figure 8:
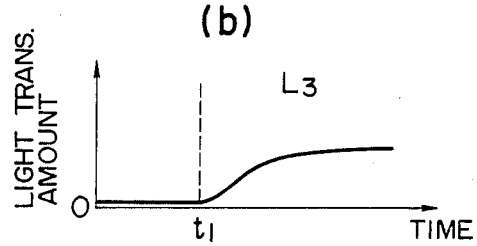
Figure 9:
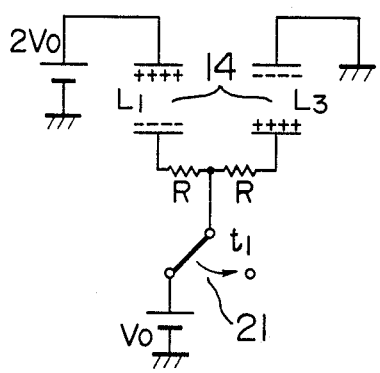
Figure 10:
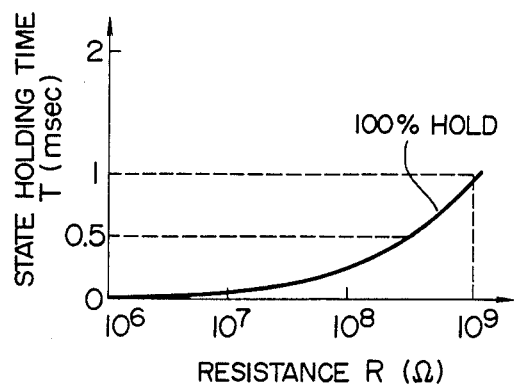
Figure 11:
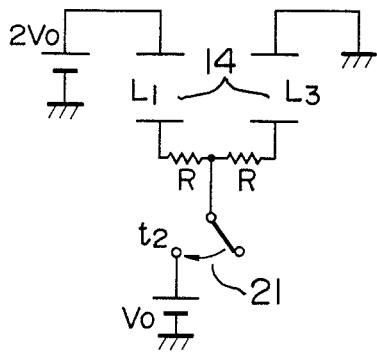
Figure 12:
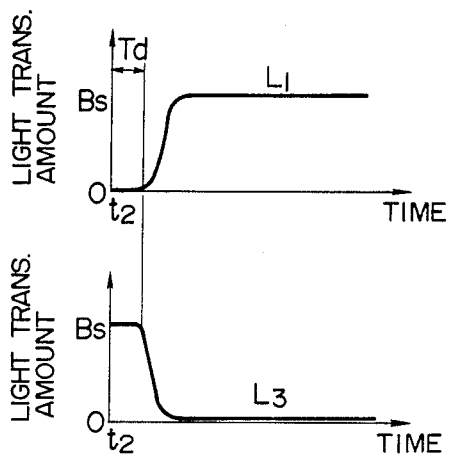
Figure 13:
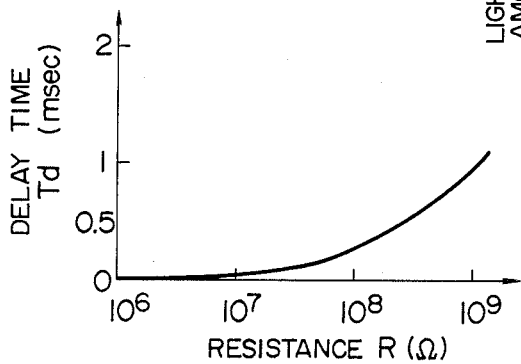
Figure 14:
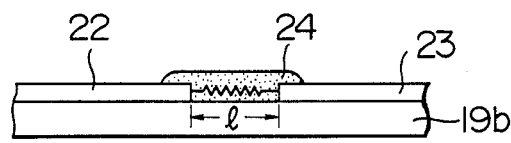
Figure 15:
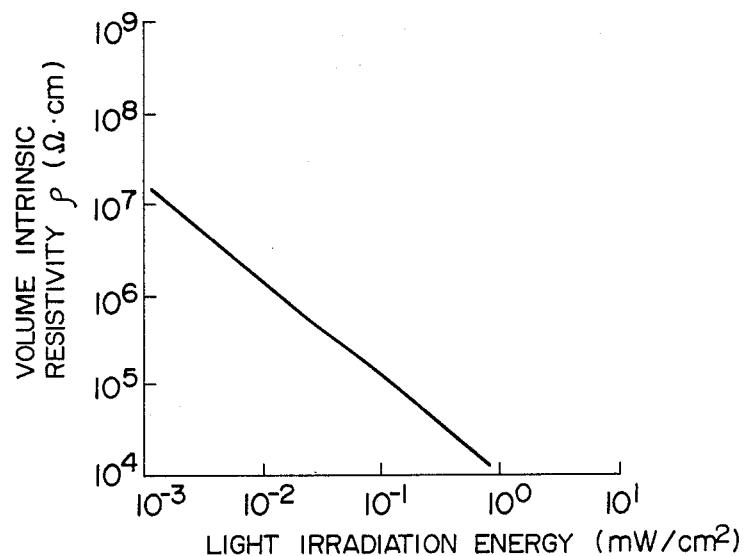
Figure 16:
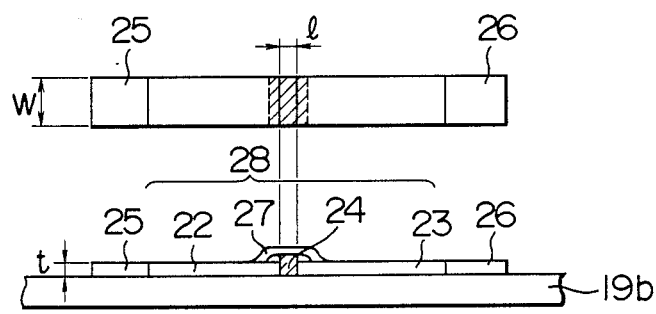
Figure 17:
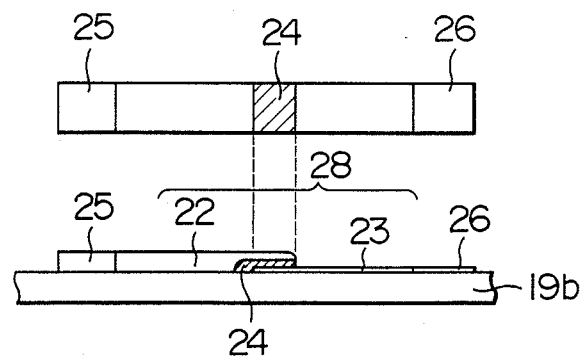
Figure 18A:
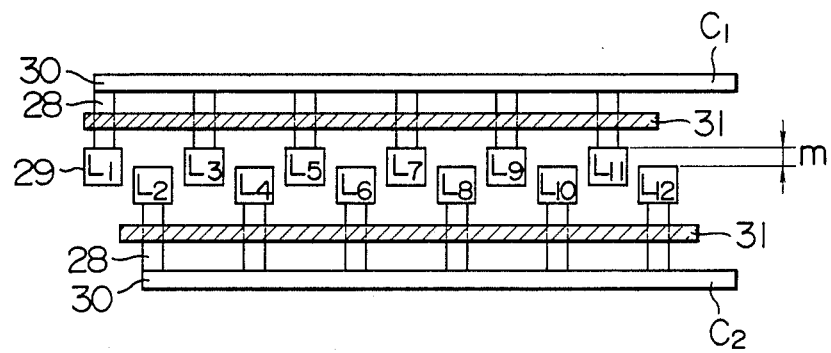
Figure 18B:
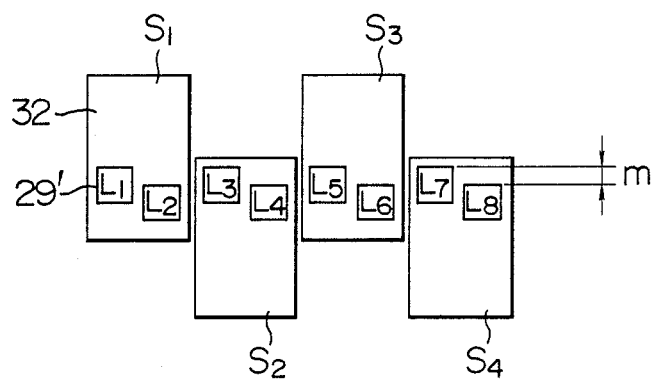
Figure 19A:
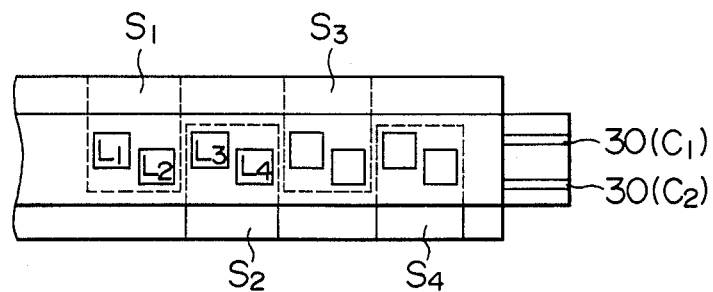
Figure 19B:
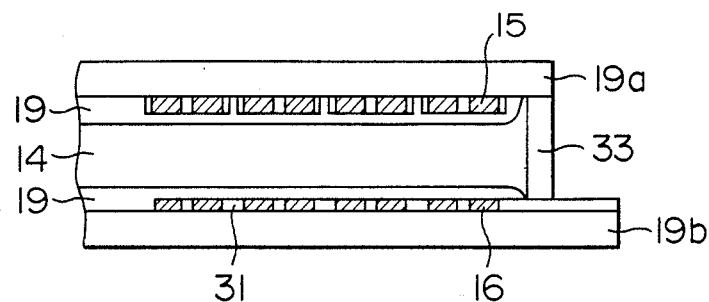
Figure 20:
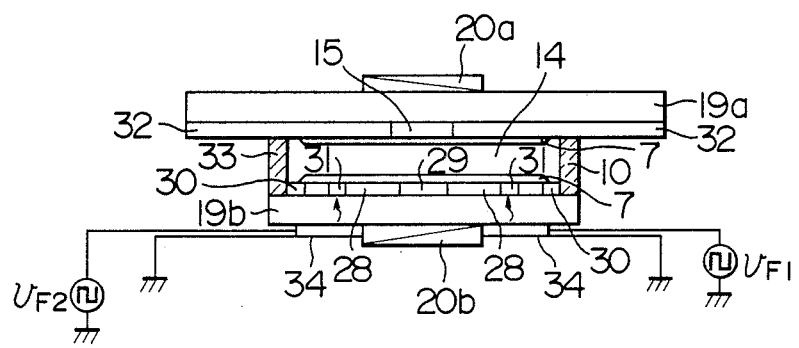
Figure 21:
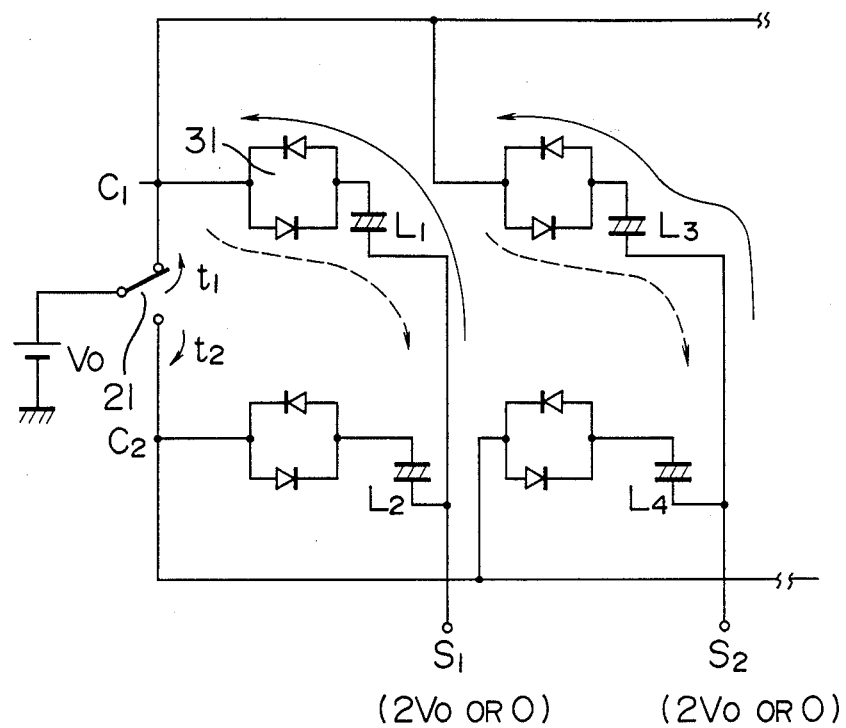
Figure 22:
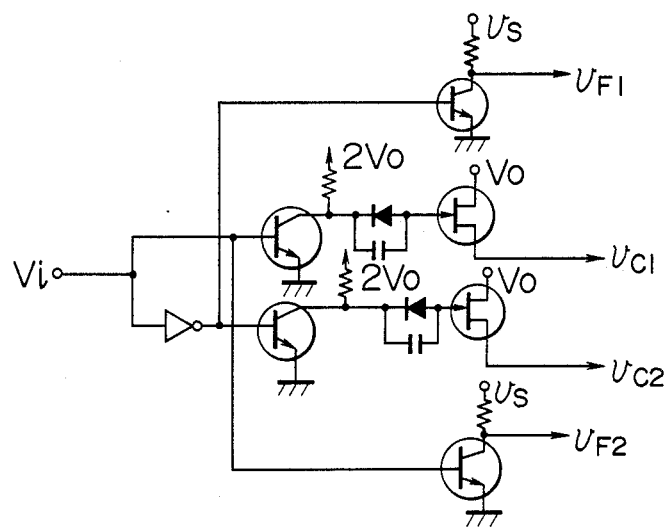
Figure 23:
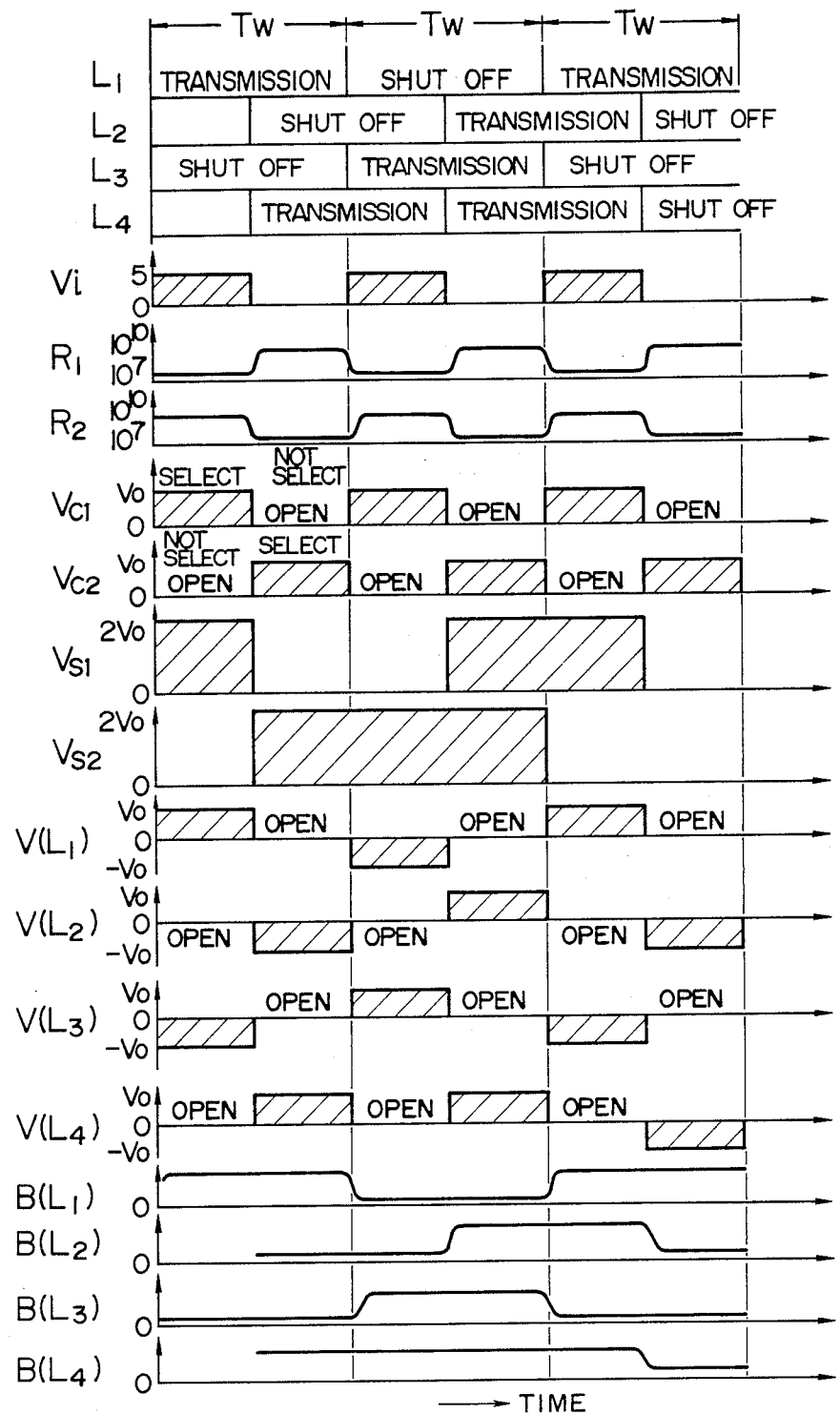
Figure 24A:
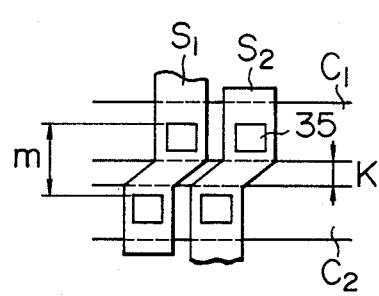
Figure 24B:
Figure 25:
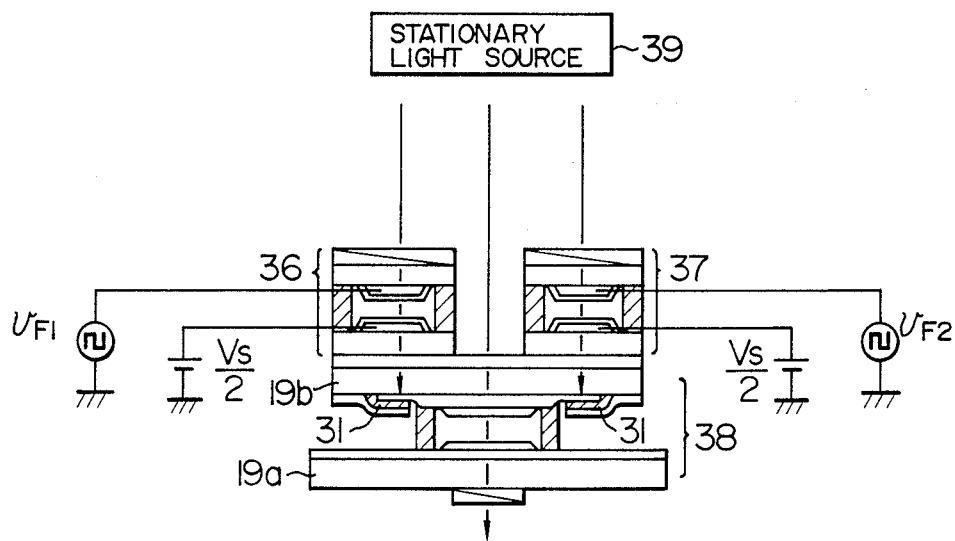
Figure 26:
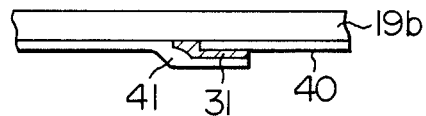
Figure 27:
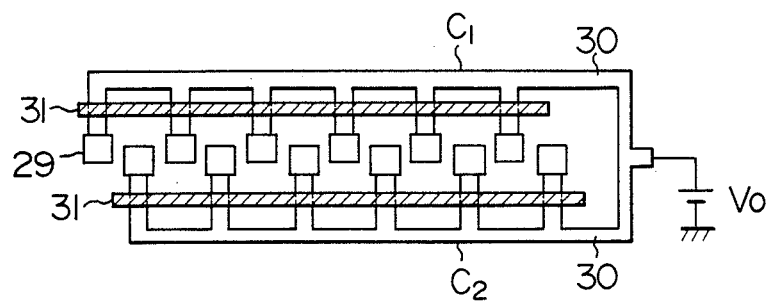
Figure 28:
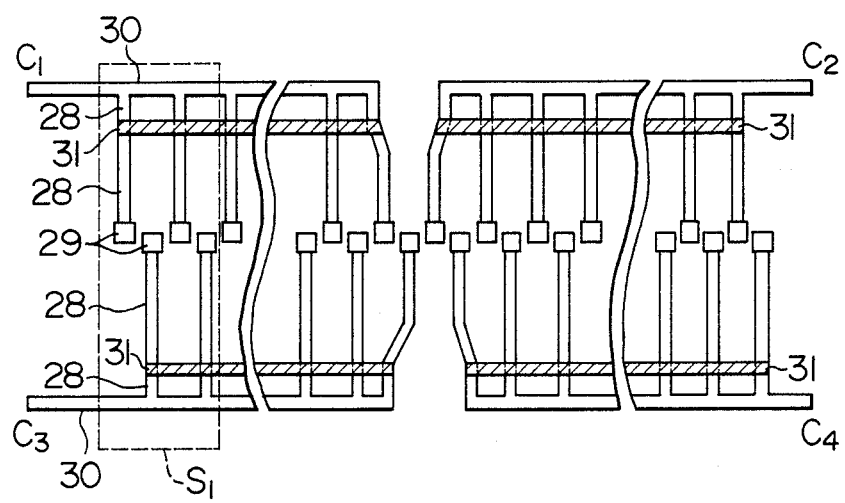
Figure 29:
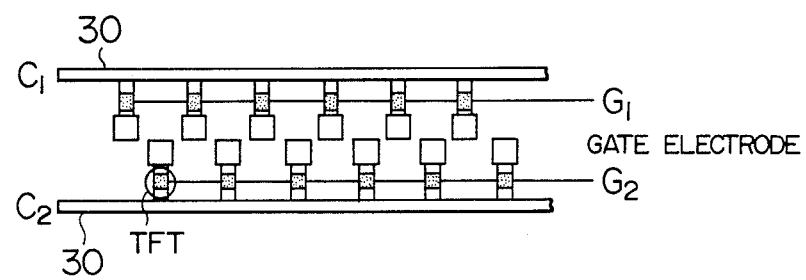
Figure 30:
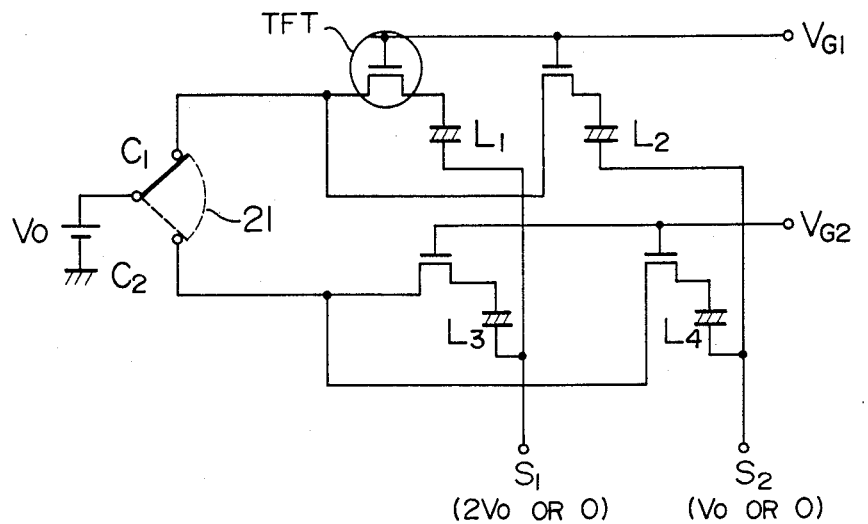
Figure 31:
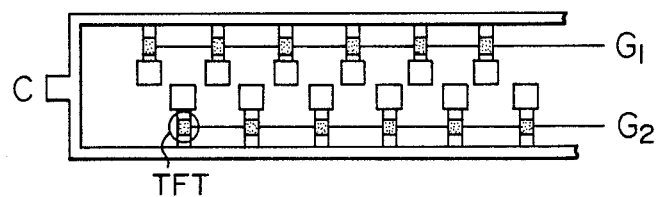
Figure 32:
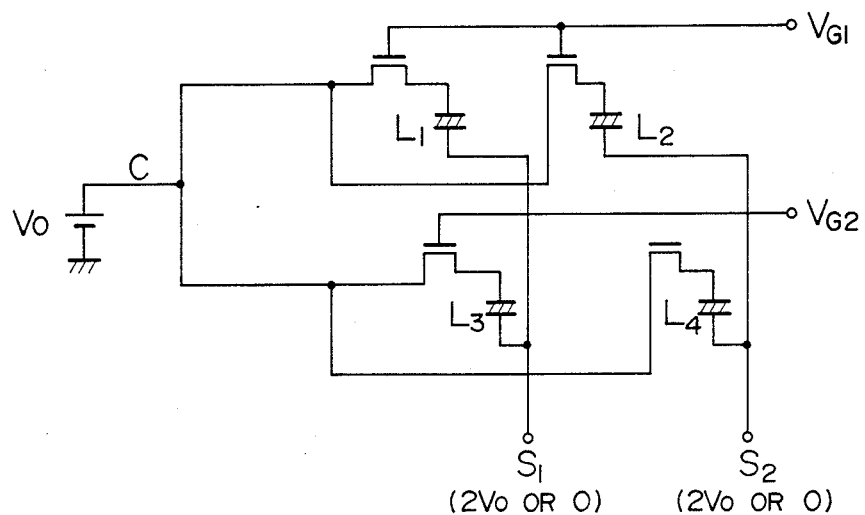
Figure 33:
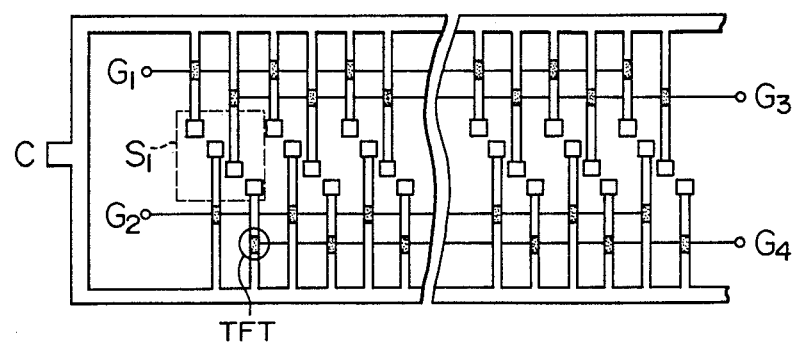
Figure 34:
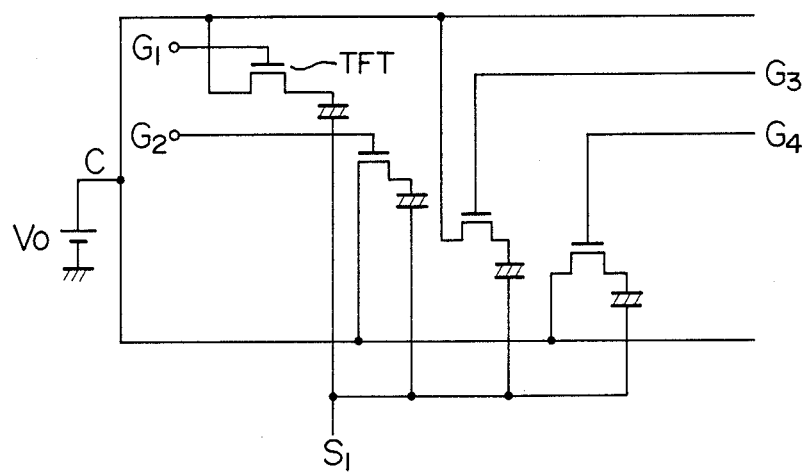

FIG. / is a diagram showing a method of driving the time-sharing drive optical switch array;

FIG. 8 shows light transmission characteristic diagrams of the time-sharing drive optical switch array;

FIG. 9 is a diagram showing a method of driving the time-sharing drive optical switch array according to the invention;

FIG. 10 is a diagram showing the relation between the state holding time and the resistance value;

FIG. 11 is a graph showing a method of driving the time-sharing drive optical switch array according to the invention;

FIG. 12 shows response characteristic diagrams of the optical switch array;

FIG. 13 is a graph showing the relation between the value of external resistor R and the response delay time;

FIG. 14 is a diagram showing an embodiment of an external resistor of which a resistance value changes de to the light irradiation;

FIG. 15 is a characteristic diagram of the resistivity to the light irradiation energy of the photoconductor;

FIG. 16 is a diagram showing an embodiment of the invention in which a photoconductor is assembled as an external resistor in a scanning electrode;

FIG. 17 is a diagram showing another embodiment of a photoconductive external resistor according to the invention;

FIGS. 18(a) and 18(b) show an embodiment of a time-sharing drive optical switch array according to the invention;

FIGS. 19(a) and 19(b) show a plan view and a cross sectional view showing an actual structure of the embodiment shown in FIG. 18;

FIG. 20 is a cross sectional view of the main part of the embodiment of the optical switch array according to the invention;

FIG. 21 is an equivalent circuit diagram of the optical switch array in FIG. 20;

FIG. 22. shows an embodiment of a drive circuit of the optical switch array of the invention;

FIG. 23 is a signal time chart when the optical switch array is time-sharingly driven by the circuit in FIG. 22;

FIGS. 24(a) and 24(b) show an electrode structure of a conventional time-sharing drive optical switch array;

FIG. 25 is a cross sectional view of the main part of the time-sharing drive optical switch array according to the invention;

FIG. 26 is an enlarged diagram of a photo sensor portion of the optical switch in FIG. 25;

FIG. 27 shows still another embodiment of a time-sharing drive optical switch array according to the invention;

FIG. 28 shows further another embodiment of a time-sharing drive optical switch array according to the invention;

FIG. 29 shows further another embodiment of a time-sharing drive optical switch array of the invention;

FIG. 30 is an equivalent circuit diagram of the embodiment in FIG. 29;

FIG. 31 shows further another embodiment of a time-sharing drive optical switch array of the invention;

FIG. 32 is an equivalent circuit diagram of the embodiment in FIG. 31;

FIG. 33 shows further another embodiment of a time-sharing drive optical switch array of the invention; and FIG. 34 is an equivalent circuit diagram of the embodiment in FIG. 33.

DESCRIPTION OF THE PREFERRED EMBODIMENTS

Figure 1:
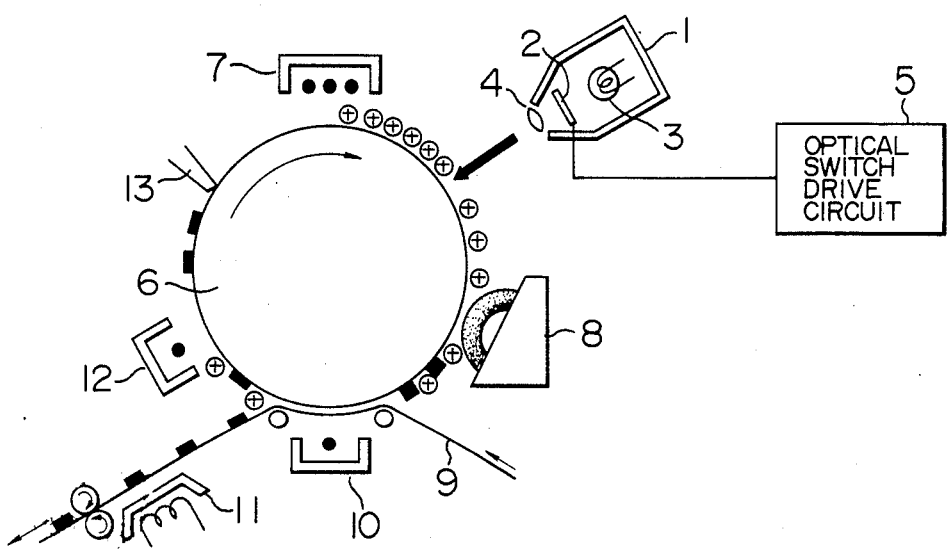
FIG. 1 is a schematic diagram of an optical printer using an optical switch array.

FIG. 1 shows an outline of an optical printer using an optical switch array as a print head. In the diagram, a print head 1 comprises an optical switch array 2, a light source 3 such as, for example, fluorescent lamp, and a focusing lens 4. The optical switch array 2 is constructed by arranging in a line a plurality of optical switch elements adapted to transmit or shut off the light in response to a signal from an optical switch drive circuit 5. The light transmitted through the optical switch elements are irradiated as light spots onto the surface of a photo sensitive drum 6 by the focusing lens 4. A photoconductive material is coated on the surface of the photoconductive drum 6 and this surface is previously charged by a corona charging device 7. When the light is irradiated to the photoconductive material, it changes from the insulative state to the conductive state and the charges on the surface are discharged. The light spots transmitted through the optical switch array 2 are irradiated onto the drum surface from the print head 1 synchronously with the clockwise rotation of the drum 6 in the direction indicated by an arrow in FIG. 1. Thus, an electrostatic latent image is formed on the surface of the drum 6 by the dots corresponding to an optical image from the print head 1.

Reference numeral 8 denotes a toner apparatus for allowing the toner to be deposited onto the drum surface and for developing the electrostatic latent image; 9 is a recording paper; 10 a transfer device to transfer the toner image onto the recording paper 9; and 11 a fuser apparatus to fix the transferred toner image onto the recording paper. For the next print, a discharging device 12 and a cleaning apparatus 13 for removing the surplus toner are preferably provided.

The foregoing components operate by use of the principle of the well-known electrophotographic apparatus. The optical switch drive circuit controls the optical switch array in response to a print signal. A circuit as shown in, e.g., FIG. 22 may be used in this invention as the optical switch drive circuit. The circuit in FIG. 22 will be explained hereinlater.

The nature of the ferroelectric liquid crystal which is used in the optical switch array of the invention will row be described with reference to FIGS. 2(a) to 2(c).

The ferroelectricity in a liquid crystal is presented in the Chiral Smectic C-phase and Chiral Smectic H-phase.

In the case of those liquid crystal phases, the liquid crystal molecules have a spiral structure and have the spontaneous polarization in the direction of minor axis of the molecules. In this specification, this kind of liquid crystal is referred to as the ferroelectric liquid crystal hereinbelow. FIGS. 2(a), 2(b), and 2(c) are diagrams showing orientation states of the ferroelectric liquid crystal molecules. In Figs. 2(a) to 2(c), reference numeral 14 denotes a ferroelectric liquid crystal; 15 and 16 are upper and lower electrodes which sandwich the liquid crystal; and 17 denotes a liquid crystal molecule, in which a long line indicates a major axis of molecule and a short line represents a minor axis of molecule. Numeral 18 denotes an arrow indicative of the direction of spontaneous polarization of the liquid crystal molecule 17. When the liquid crystal layer is thinly formed so as to be =a thickness (When using liquid crystal of 4–5 μm spiral pitch, the thickness of the layer is arranged with 4 to 5 μm.) which is nearly equal to the spiral pitch of liquid crystal, the liquid crystal molecule presents a "spray alignment" as shown in FIG. 2(a). FIGS. 2(b) and 2(c) indicates orientations when an electric field E is vertically applied to the liquid crystal layer 14 through the upper and lower electrodes 15 and 16, respectively. The liquid crystal molecule 17 is aligned so that the direction of the spontaneous polarization 18 is parallel with the direction of the electric field E. Therefore, the liquid crystal molecule 17 is oriented so that the major axis of the molecule is parallel with the electrode surface and at the same time, the directions of orientation in Figs. 2(b) and 2(c) are opposite. By changing the direction of electric field in this manner, the direction of orientation of liquid crystal molecule can be controlled.

Figure 3:
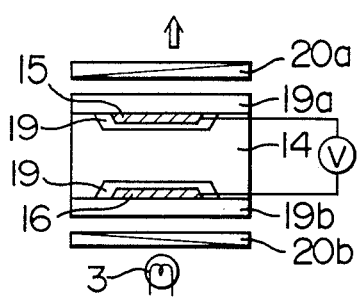
FIG. 3 is a cross sectional view of an optical switch element.

FIG. 3 shows a structure of an optical switch element using the ferroelectric liquid crystal. Orientation films 19 which were subjected to the orientation process are coated on the transparent electrodes 15 and 16. The liquid crystal layer 14 is sandwiched in parallel by glass substrates 19a and 19b as two transparent insulating substrates. Polarizing plates 20a and 20b are arranged (crossed nicols) on the outsides of the upper and lower glass substrates 19a and 19b so that the polarization axes perpendicularly cross. In this example, two polarizing plates 20a and 20b have been arranged in a manner such that the light is transmitted when a positive DC voltage is applied from a voltage source V to the liquid crystal layer 14 and the light is shut off when a negative DC voltage is applied to the liquid crystal layer 14. However, the polarizing plates 20a and 20b may be also arranged such that the relation between the polarity of the applied voltage and the light transmission state is reversed.

Figure 4:
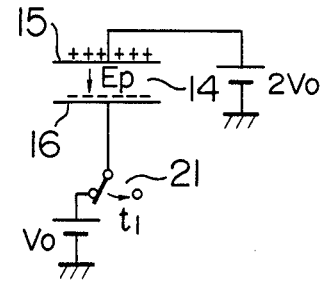
FIG. 4 is a diagram showing a method of driving the optical switch element.
Figure 5:
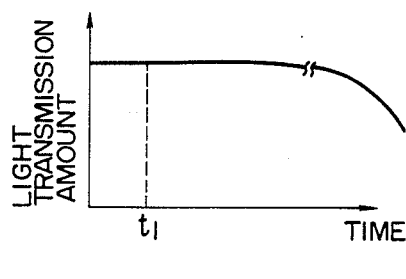
FIG. 5 is a light transmission characteristic diagram of the optical switch element.

FIG. 4 shows an equivalent circuit to drive the optical switch element in FIG. 3. As shown in FIG. 4, the DC voltage of $2V_0$ is always applied to the upper electrode 15 and the DC voltage of $V_0$ is initially applied to the lower electrode 16 and a switch 21 is opened at time $t_1$. The light is irradiated from the light source 3 onto the optical switch element and a change in light transmission amount is measured. The characteristic of light transmission amount, in this case, becomes as shown in FIG. 5. It will be understood from FIG. 5 that even after the switch 21 was opened, the light transmission amount doesn't suddenly decrease. The light transmission amount is reduced for a few hours in dependence on a material of liquid crystal. This is because charges are accumulated near the electrode of the liquid crystal layer by applying the DC voltage and the rotation of the liquid crystal molecule is suppressed by a DC electric field $E_P$ based on those charges. In association with the natural discharge of the accumulated charges due to the internal resistance of the liquid crystal, the liquid crystal molecules change from the state shown in FIG. 2(b), to the state in FIG. 2(a), and the light transmission amount attenuates. Such a state holding effect is hereinafter referred to as a "relaxative memory effect".

Figure 6:
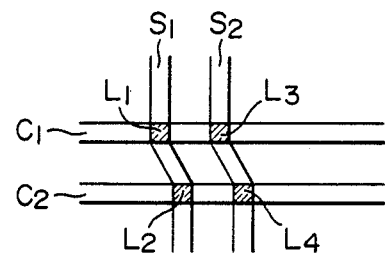
FIG. 6 is a partial enlarged diagram of a time-sharing drive optical switch array.

FIG. 6 is a partial enlarged diagram of a time-sharing drive optical switch array which is composed of optical switch elements. A line selection signal is sequentially supplied to scanning electrodes $C_1$ and $C_2$ The scanning electrodes to which no line selection signal is supplied are opened. Only the optical switch elements arranged on the scanning electrodes supplied with the line selection signal are driven (opened/ closed) by signal electrodes $S_1$ and $S_2$, so that the scan is executed line by line at a time.

Figure 7:
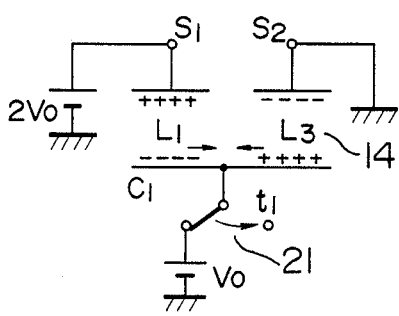

Pixels (optical switch elements) $L_1$ and $L_3$ existing at the positions where the scanning electrode $C_1$ and signal electrodes $S_1$ and $S_2$ cross will now be considered. As shown in FIG. 7, for example, the signal electrode $S_1$ is set to $2V_0$ and the signal electrode $S_2$ is set to zero potential. The potential of the scanning electrode $C_1$ is set into the open state (nonselection state) at time $t_1$ from $V_0$ (the selection signal is supplied).

Since the voltage of $+V_0$ is applied to the pixel $L_1$ and the voltage of $-V_0$ is applied to the pixel $L_3$ for the period from 0 to $t_1$, the pixel $L_1$ becomes the light transmission state and the pixel $L_3$ becomes the light shut-off state. When the switch is opened at time $t_1$, the relaxative memory effect as described in FIG. 5 is not obtained and the light transmission amount of the pixel $L_1$ rapidly decreases as shown in FIG. 8(a). On the contrary, in the pixel $L_3$, the opposite phenomenon occurs as shown in FIG. 8(b). The inventors have examined the reason of such phenomena, so that it has been found out that since the polarities of the charges on the scanning electrodes differ in the pixels $L_1$ and $L_3$, they are neutralized immediately after the switch 21 was opened (non-selection state) and the internal electric field $E_P$ is extinguished.

Now, assuming that the relaxative memory effect is not provided in the optical switch array of the time-sharing drive type, the light can be transmitted only for the period when the selection signal is applied to the scanning electrode and the light cannot be transmitted for the period when no selection signal is supplied. In other words, the exposure of the dots must be completed in the period when the selection signal is supplied. If the number of time divisions increases, the period of supply of the selection signal will be reduced in response to it. In the case of the time-sharing drive of the duty of $\frac{1}{2}$, the selection signal period is T/2 (T is a driving period of one line of the optical switch array). In the case of the timesharing drive of the duty of 1/n, the selection signal period becomes T/n. Namely, even if it is intended to print at a high speed by increasing the number n of divisions, the exposure period will be reduced into 1/n, so that the print cannot be performed because of the limitation of sensitivity on the photo sensing side (on the side of the photoconductor). Therefore, by a use of the relaxative memory effect so as to transmit the light subsequently after the absence of the selection signal, that is in non-selection state, as well, enough long exposure period can be obtained even if the number n of time divisions is increased.

Therefore, to suppress the neutralization of charges on the scanning electrode, as shown in FIG. 9, the scanning electrode is divided and a resistor 2R is inserted as a connector between the scanning electrodes. Then, the same experiment as shown in FIG. 7 was performed. Thus, it has been found that with an increase in resistance value, the light transmission amount after the switch 21 was opened can be held substantially constant. FIG. 10 shows the relation between the resistance value R and the state holding time in the case where the pixel area is 8 $\mu m \times 100$ $\mu m$.

It will be understood that when the resistance value is 1,000 M$\Omega$, the light transmission state can be also maintained for 1 msec after the switch was opened.

In the case of applying the ferroelectric liquid crystal optical switch array to the printer head of the electrophotographic type, the printing time of one line is 1.25 msec to realize the performance of the order of the resolution of 10 dots/mm and the printing speed of 1,000 lines/minute. Therefore, in the case of time-sharingly driving such an optical switch array with the duty of $\frac{1}{2}$, about 0.625 msec is required as the state holding time. Thus, the necessary resistance value R is about 600 M$\Omega$ as will be understood from FIG. 10.

Since the state holding time is reduced with an increase in printing speed, the necessary resistance value also decreases.

Since the state holding effect depends on the time constant which is determined by the product of the external resistance R and the capacitance C of the liquid crystal layer in the region where the signal electrode and scanning electrode overlap, when the pixel area changes, the necessary value of R also varies.

Namely, since the capacitance C of the liquid crystal layer increases with an increase in pixel area, the value of external resistance R may be reduced to make the time constant constant.

The state when the voltage is applied to the scanning electrode (selection signal is supplied thereto) will now be described with reference to FIGS. 11 and 12.

As shown in FIG. 11, when the switch 21 is closed at time $t_2$ and the voltage $V_0$ is applied to the scanning electrode, the light transmission amount of the pixel $L_1$ increases and the light transmission amount of the pixel $L_3$ decreases as shown in FIGS. 12(a) and 12(b). In this case, a time delay $T_d$ until the change in light transmission amount occurs depends on the value of external resistance R. As shown in FIG. 13, $T_d$ increases as the value of resistance R increases. The value of resistance R needs to be below 10 M$\Omega$ in order to set the time delay to be 0.1 msec or less.

Therefore, to realize the time-sharing drive optical switch array using the relaxative memory effect without any response delay, it is necessary to set the value of resistance R to be, e.g., about below 10 M$\Omega$ when the selection signal is supplied. On the contrary, when the selection signal is not supplied, the value of resistance R needs to be set to, e.g., about 600 M$\Omega$ or more.

FIG. 14 shows an embodiment in which the photoconductor of which a resistance value varies by the light irradiation is used as the external resistor R.

As shown in FIG. 14, conductors 22 and 23 (scanning electrodes) are formed on the transparent substrate 19b such as glass plate or ceramic plate or the like so as to face each other at a distance (. A photoconductor 24, for example, ZnO, CdS, polyvinyl carbazole, phthalocyan, amorphous silicon (a—Si), a-AS$_2$Se$_3$, or the like is formed on the substrate 19b and conductors 22 and 23. Such a structure is called a planar type and can be easily manufactured. Therefore, this device structure is frequently used in photo sensors and the like.

In particular, an example of an a—Si film will be described. The a—Si film can be formed on the substrate by glow discharging method, plasma CVD method, rf (radio frequency) sputtering method, or the like. The a—Si film is sensitive to the light in the visible region of 450 to 750 nm and the resistance value remarkably decreases (by three to four digits) by the light irradiation. FIG. 15 shows a change in volume intrinsic resistivity $\rho$ of the a—Si film when the LED light emitting device of the emission spectrum of 660 nm is used and the light was irradiated onto the a—Si film (having the thickness of 0.6 $\mu$m and PH$_3$ is doped at a ratio of 1.8 ppm) formed by the glow discharging method. With an increase in light irradiation energy, the value of $\rho$ promptly decreases. In the case of irradiating the light energy of 1 mW/cm$^2$, $\rho$ decreases by about three digits.

FIG. 16 shows a part of an electrode pattern of the scanning electrode. Reference numeral 25 denotes an opening portion corresponding to the optical switch element $L_1$ and is an ITO (Indium Tin Oxide) film; 26 is a scanning electrode conductor extracting portion; 24 the a—Si film; 22 and 23 the conductors consisting of A(, Cr, Ni, ITO, SnO$_2$, or the like; and 27 a protecting film of the a—Si film. For example, an SiO$_2$ film may be used as the protecting film 27.

A wiring portion 28 of the scanning electrode is constituted by the conductors 22, 23, and 24. The wiring portion 28 serves as the photo sensor of the planar type shown in FIG. 14. Now, assuming that the width W is 80 $\mu$m, the thickness of a—Si film is 1,200 Å, and the distance l is 10 $\mu$m, the resistance value will be 10$^{10}$ $\Omega$ when the light is not irradiated, while the resistance value will be 10$^7$ $\Omega$ when the light of 1 mW/cm$^2$ is irradiated. These resistance values are small.

Therefore, in the case of using the planar type photo sensor, by irradiating the light of 1 mW/cm$^2$ when the selection signal is supplied and by irradiating no light when the selection signal is not supplied, the time-sharing drive using the relaxative memory effect can be performed due to the resistance change.

FIG. 17 shows a method whereby the photo sensor having a sandwich type structure is used as the external resistor. The conductor 23 and extracting portion 26 are formed on the glass substrate 19b by a chromium deposited film. Next, an a—Si:H (hydroamorphous silicon) film of a photoconductor having the thickness of about 1 $\mu$m is formed on a part of the conductor 23 by a plasma CVD method. An ITO film is further formed on the photoconductor film 24 by evaporation deposition. Thus, the ITO film 25 and conductor 22 are obtained.

The light response time of the photo sensor having the foregoing constitution is so short to be below 50 $\mu$sec and the ratio of the resistance values when the light is irradiated and when it is not irradiated is 3 $\times$ 10$^3$.

In the invention, any of the photo sensors of the planar type and sandwich type may be used.

The system in which the photoconductor a resistance value of which varies in dependence on the light irradiation is used has been described above. However, it is also possible to use the MOF film or the bipolar or field effect transistors whose resistance value can be changed by a certain electric signal.

FIGS. 18(a) and 18(b) are diagrams showing an embodiment of a time-sharing drive optical switch array of the invention and illustrates an electrode pattern of the time-sharing drive liquid crystal optical switch array having the duty of $\frac{1}{4}$. FIG. 18(a) shows the scanning electrodes and FIG. 18(b) shows the signal electrodes. Although the signal electrodes and scanning electrodes were separately illustrated for easy explanation, both of these electrodes actually overlap so as to sandwich the liquid crystal layer. The scanning electrode comprises: an optical switch opening portion 29 consisting of an ITO (Indium Tin Oxide) film or the like; a scanning electrode extracting conductor portion 30 consisting of a chromium deposited film; and the wiring portion 28. The wiring portion 28 and extracting conductor portion 30 constitute a connector to connect the opening portion 29. The wiring portion 28 has, for example, at the central portion the photo sensor portion of the sandwich structure having an a—Si layer 31 serving as a resistive element a shown in FIG. 17. The a—Si layer 31 may have substantially the same width as the optical switch opening portion 29 by etching or mask deposition method or the like, or may be also constituted by continuously connecting adjacent resistive elements like a strip as shown in FIG. 18(a). The functions of the above two constitutions are the same and the latter constitution can be more easily manufactured. The resistive elements may be also provided in the conductor portion 30 without limiting to the wiring portion 28.

FIG. 18(b) shows the signal electrodes which are used in combination with the scanning electrodes shown in FIG. 18(a). The signal electrode comprises an optical switch opening portion 29' consisting of ITO and a signal electrode extracting conductor portion 32 consisting of a chromium deposited film.

FIGS. 19(a) and 19(b) show a plan view and a cross sectional view illustrating a structure of a liquid crystal optical switch array panel consisting of a combination of glass electrode substrates in each of which the electrode pattern shown in FIGS. 18(a) and 18(b) is formed on the surface. Reference numeral 19 denotes an orientation film consisting of a resin of the polyimide system; 14 is the ferroelectric liquid crystal layer; and 33 is a sealing portion.

FIG. 20 shows a structure of another embodiment of a liquid crystal optical switch array of the present invention and FIG. 21 shows an equivalent electric circuit of his optical switch array. The polarizing plates 20a and 20b are arranged in the portions corresponding to the optical siwtch portions on the liquid crystal optical switch array panel substrates 19a and 19b in the crossed nicols state. Light emitting devices 34 are provided to irradiate the light onto the photoconductor portions of the scanning electrodes $C_1$ and $C_2$. As the light emitting devices, it is possible to use the linear light source such as LED bar light source, EL panel, fluorescent lamp, or the like, or the light irradiating means consisting of a lamp and a light guide plate. FIG. 21 is an equivalent circuit of the optical switch array in FIG. 20. The photo sensor portion 31 is represented by the bidirectional diode which is made conductive in the direction of electric field when it receives the light. Liquid crystals $L_1$ to $L_4$ serve as capacitors. In the diagram, when the scanning electrode $C_1$ is selected, the scanning electrode $C_2$ is not selected and is open. When the voltage of $2V_0$ is now applied to the signal electrode $S_1$ or $S_2$, the voltage is applied in the direction indicated by a solid line arrow in the diagram, so that the optical switch element $L_1$ or $L_2$ can transmit the light. When the selection signal is supplied to the scanning electrode $C_2$ at time $t_2$, if no light is irradiated onto the photo sensor 31, the photo sensor 31 has a large resistance value and the charges of the liquid crystals $L_1$ and $L_3$ keep the light transmission state in the time constants determined by their resistance values and the capacitances of $L_1$ and $L_2$.

FIG. 22 shows a generating circuit to generate voltage waveforms $v_{c1}$ and $v_{c2}$ which are applied to the scanning electrodes $C_1$ and $C_2$ and voltage waveforms $v_{F1}$ and $v_{F2}$ which are applied to the respective light emitting devices in order to flicker the light emitting devices (LED bar light source) 34. An FET is driven in response to a sync signal $V_i$ (which has a period $T_w$ and is at a high level for the period of $T_w/2$ and at a low level for the subsequent period of $T_w/2$) and the potentials of the scanning electrodes $C_1$ and $C_2$ are switched between the voltage of $V_0$ and the open state at every period of $T_w/2$. When the scanning electrode $C_1$ is considered, in the case where the voltage of $v_{c1}$ is $V_0$, namely, when the selection signal is supplied, the voltage of $v_{F1}$ also becomes $v_s$. Thus, the light emitting devices are lit up and the resistance of the wiring portion is reduced. When the voltage of $v_{c1}$ becomes substantially the open state, namely, when no selection signal is supplied, the voltage of $v_{F1}$ becomes 0V. Thus, the light emitting devices are lit off and the resistance of the wiring portion is increased, thereby allowing the relaxative memory effect to be presented.

The same also shall apply to the scanning electrode $C_2$.

FIG. 23 shows a time chart for the voltage waveforms which are applied to the signal electrodes and scanning electrodes and for the light transmission characteristics. In this time chart, examples of the pixels $L_1$, $L_2$, $L_3$, and $L_4$ will be described.

In the case of allowing the light to be transmitted, the voltage of $2V_0$ is applied to the signal electrode. In the case of shutting off the light, the potential of the signal electrode is set to zero (ground potential). In FIG. 23, $R_1$ and $R_2$ denote resistance values in the wiring portion of the scanning electrodes $C_1$ and $C_2$.

To transmit the light, the voltage $V_s$ of the signal electrode is set to $2V_0$. To shut off the light, the potential of the signal electrode is set to zero volt. Thus, in the liquid crystal layer of the pixel which transmits the light, the voltage of $+V_0$ becomes the open state when the selection signal is supplied (for the period of $T_w/2$), while the potential of the scanning electrode becomes the open state when no selection signal is supplied (for the period of $T_w/2$), and at the same time the resistance between the adjacent segments on the scanning electrode becomes so high to be above hundreds of $M\Omega$.

On the other hand, in the liquid crystal layer of the pixel which shuts off the light, the voltage of $-V_0$ becomes the open state when the selection signal is supplied and the potential of the scanning electrode becomes the open state when no selection signal is supplied. As will be understood from FIG. 23, the resistance values of the wiring resistors $R_1$ and $R_2$ of the scanning electrode become so low to be below 10 $M\Omega$ when the selection signal is supplied, while they become so high to be above hundreds of $M\Omega$ when no selection signal is supplied. In the changes in light transmission amount B of the pixels $L_1$ to $L_4$, as will be understood by comparing the changes in light transmission amounts of the pixels $L_1$ and $L_2$ on the scanning electrode $C_1$ and by similarly comparing the changes in light transmission amounts of the pixels $L_2$ and $L_4$ on the scanning electrode $C_2$, even if the potentials of the signal electrodes $S_1$ and $S_2$ differ (one potential is $2V_0$ and the other potential is zero), the light transmission state doesn't change for the period when no selection signal is supplied and the light transmission state when the selection signal is supplied is also maintained even for the period when the selection signal is not supplied. As described above, according to the invention, even if the operating voltage of the ferroelectric liquid crystal doesn't have the threshold value characteristic, the time-sharing drive can be accomplished and the number of drivers to drive the optical switch elements can be reduced while effectively using the function of the optical switch having a high response speed.

On the other hand, an electrode arrangement of a conventional time-sharing drive optical switch array is disclosed in JP-A No. 60-50556 filed on Aug. 31, 1983 by Canon Inc. FIG. 24(a) shows such a conventional electrode arrangement. The scanning electrodes $C_1$ and $C_2$ are formed with opening portions 35 consisting of transparent conductor films such as ITO or the like. The scanning electrodes $C_1$ and $C_2$ need to be arranged at only a predetermined distance K away from each other for insulation. Therefore, when the resolution assumes P dots/mm, the distance m between optical switches of the optical switch array becomes $m \geq 1/P + K$. Thus, the print using this optical switch array becomes a zigzag formation as shown in FIG. 24(b). Therefore, in order to print a straight line, print data must be delayed to be transmitted to the optical switch array according to the value of K. So, buffer memory is required for signal delaying.

According to the embodiment, however, as shown in FIG. 18(a), each of the opening portions of the scanning electrodes is connected to the scanning electrode extracting conductor portion by the wiring portion. Therefore, the distance m between the respective optical switch columns of the scanning electrodes $C_1$ and $C_2$ can be set to an arbitrary value.

The voltage pulses and light transmission characteristics in the case of time-sharingly driving at the duty of ½ are as follows. Namely, as shown in FIG. 23, there is the deviation of the phase of only $T_w/2$ between the light transmission characteristics of the pixels $L_1$ and $L_3$ corresponding to the scanning electrode $C_1$ and of the pixels $L_2$ and $L_4$ corresponding to the scanning electrode $C_2$.

On the other hand, in the optical printer, when it is assumed that the print resolution in the paper feed direction (rotational direction of the drum) is P dots/mm, the movement distance of the drum for the period of $T_w/2$ will be $(\Delta+1/N)$ 1/P, where $\Delta$ time of the drive signal. Now, assuming that $\Delta=0$, the drum will move by only the distance of (1/2P) mm. Therefore, to expose one optical spot column after completion of the exposure of two lines (for the period of $T_w$), it will be sufficient to set the value of m in FIGS. 18(a) and 18(b) to 1/2P mm. In the case of N time divisions, the value of m may be set to (1/NP) mm.

Thus, the optical spots can be aligned in a line and don't become zigzag as in the conventional optical switch array. Therefore, the same print quality as that in the case of printing by the laser beam printer is obtained.

FIG. 25 is a cross sectional view showing another embodiment of a time-sharing drive optical switch of the invention. In the embodiment in FIG. 20, the system in which the light emitting devices are used as light irradiating means for irradiating the light onto the photoconductor has been described. However, in the embodiment in FIG. 25, a system in which a stationary light source and a liquid crystal optical shutter for conversion between the stationary light and the flickering light are combined will now be described.

In FIG. 25, reference numerals 36 and 37 denote optical switches using ferroelectric liquid crystal. The light from a stationary light source 39 is switched on the basis of the electric signals $v_{F1}$ and $v_{F2}$ (FIG. 22), thereby irradiating the light pulses onto the photoconductor 31. Numeral 38 denotes a timesharing drive optical switch array panel, and 19b indicates the scanning electrode substrate on which the photoconductor is formed.

FIG. 26 illustrates an enlarged diagram of a part of the scanning electrode of the optical switch in FIG. 25. An ITO film 40 is formed on a glass plate. The a—Si film 31 is formed on the ITO film 40. A chromium deposited film 41 is further formed on the a—Si film 31. The light transmits the glass plate and enters the surface of the a—Si film 31. This constitution is vertically opposite to that shown in FIG. 17. In FIG. 25, the light source to expose the photo sensitive material (fluorescent lamp or the like) provided in the printer head may be commonly used as the light source 39. On the other hand, as the converting optical switches 36 and 37, the devices in which a plastic film is used as a substrate can be also used to realize the thin switches.

FIG. 27 shows a structure of still another embodiment of a time-sharing drive optical switch array of the invention. If the photoconductor (photo sensor) 31 such that the resistance value largely varies by eight to nine digits due to the light irradiation and the volume intrinsic resistance value in the dark state is above $10^{12}$ $\Omega$·cm is used, when the resistance value between the opening portion 29 and the extracting conductor portion 30 becomes the value of the order of $10^{13}$ $\Omega$, the leak current between the conductor portion 30 and the opening portion 29 when no light is irradiated onto the photoconductor can be substantially ignored. As shown in FIG. 27, the extracting conductor portion 30 of the scanning electrodes $C_1$ and $C_2$ is commonly used and previously biased by the DC voltage $V_0$. When no light is irradiated, the potential is seemingly in the open state since the resistance value of the photoconductor 31 is high. When the light is irradiated, the resistance value becomes low and the voltage (selection signal) is applied to the scanning electrode. Since the plane pattern of the signal electrodes is the same as FIG. 18(b), its description is omitted.

FIG. 28 shows a scanning electrode pattern in the case of applying the invention to a time-sharing drive optical switch array of the duty of ¼ and the scanning electrodes are divided into four blocks. When the processing time of one line assumes $T_w$ by setting the light pulse irradiating time to $T_w/4$ and by sequentially driving the scanning electrodes $C_1$ to $C_4$ in accordance with this order, these scanning electrodes can be time-sharingly driven at the duty of ¼. The pattern of the signal electrode $S_1$ is as shown in the region indicated by a broken line.

FIG. 29 shows an embodiment illustrating the system of the duty of ½ in which a thin film field effect transistor (TFT) serving as a resistive element is provided for each wiring portion of the scanning electrodes. As shown in FIG. 29, between the scanning electrode extracting conductor portion 30 and the opening portion 29, a TFT is formed on the substrate 19b (not shown) and common gates $G_1$ and $G_2$ are formed in correspondence to the scanning electrodes $C_1$ and $C_2$. Since the signal electrode is the same as that in FIG. 18(b), it is omitted here.

FIG. 30 shows an equivalent circuit of the optical switch array in FIG. 29. In the case of allowing the light to be transmitted, the voltage of $2V_0$ is applied to the signal electrode $S_1$. In the case of shutting off the light, 0V is applied. When the selection signal is supplied, the switch 21 is set to the side of $V_0$ and the gate signal voltage on the selection side is set to a voltage higher than $2V_0$ and the gate is opened. When no selection signal is supplied, it is set to a negative voltage, e.g., $-5V$, so that the gate is closed.

In the case of the thin film field effect transistor TFT using a—Si, the ON resistance is $10^6$ $\Omega$ and the OFF resistance is $20^{10}$ to $10^{11}$ $\Omega$ and the effect similar to that in the case of using the photoconductor can be accomplished.

FIG. 31 shows the improved embodiment of FIG. 29 and illustrates a plane pattern of the scanning electrode. FIG. 32 shows an equivalent circuit diagram of this embodiment. Since the plane pattern of the signal electrode is the same as FIG. 18(b), it is omitted here.

When the OFF resistance of the TFT exceeds $10^{13}$ $\Omega$, this value is larger than the resistance ($10^{11}$ $\Omega$) of the liquid crystal by one digit or more. Therefore, the scanning electrodes are not divided. Even when the voltage of $V_0$ is always applied to the scanning electrodes, if the gate is OFF, almost of the voltage is applied to the TFT and no voltage is applied to the liquid crystal layer, so that substantially the open state is obtained. Therefore, the scanning electrodes are selected by the gate signal.

FIG. 33 shows a modified form of FIG. 31 and is a diagram showing a scanning electrode pattern in the case where the invention is applied to a time-sharing drive optical switch array of the duty of ¼. FIG. 34 is an equivalent circuit diagram of FIG. 33. The signal electrode S₁ is as shown in the region indicated by a broken line in FIG. 33. Since the operation of the circuit in FIG. 33 is fundamentally the same as that of the embodiment in FIG. 31, its description is omitted.

Figure 2A:
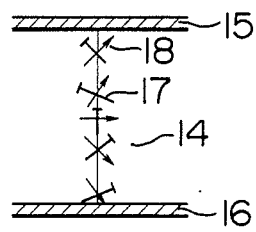
FIGS. 2(a), 2(b), and 2(c), show diagrams for explaining the nature of a ferroelectric liquid crystal which is used in the optical switch array of the invention.
Figure 2B:
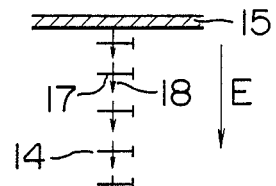
Figure 2C:
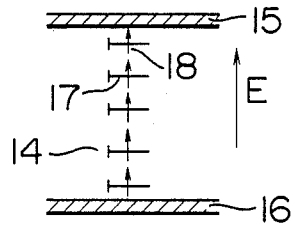

In the foregoing embodiment, the case of the "spray orientation" as shown in FIG. 2(a), has been illustrated as the orientation of the liquid crystal molecules in the state in which no voltage is applied. However, if a ferroelectric liquid crystal which becomes either one of the states shown in FIGS. 2(b) and 2(c), namely, the monostable state is used, by selecting the arrangement condition of the polarizing plates, the light shut-off or light transmission state can be always obtained in the state in which no voltage is applied. Thus, the region between the opening portions (optical switch portions) of the optical switch array where no voltage is applied can be always set into the same state (light transmission or light shut-off state) and the contrast and resolution are improved.

In the optical switch array for use in a printer, it is sufficient to arrange the polarizing plates in a manner such that the light is transmitted when no signal voltage is applied in the case of the normal phenomenon and that the light is shut off when no signal voltage is applied in the case of the reverse phenomenon.

Although the time-sharing drive optical switch array using the relaxative memory effect has been described in the foregoing embodiments, the scanning electrode structure of the present invention can be also applied to the ferroelectric liquid crystal having the operation threshold value characteristic.

In this case, by using a conductor such as a chromium deposited film or the like as a component material of the wiring portion, the same effect can be obtained.

According to the invention, there is the advantage such that even if the ferroelectric material doesn't have the operation threshold value characteristic, the time-sharing drive can be performed.

Thus, in the case of driving a number of, for example, 2000 to 2500 optical switches such as an optical switch array for a printer, the number of drivers can be remarkably reduced, so that the invention is fairly useful in terms of the driver costs, driver installing costs, and the like.

We claim:

1. A time-sharing drive optical switch array having a plurality of optical shutter units in a line, each optical shutter unit comprising:

N(n=2, 3, 4, . . .) optical shutter elements wherein each optical shutter element comprises a ferroelectric liquid crystal;

a signal electrode which is commonly connected to each optical shutter element of said optical shutter unit;

n scanning electrodes which are each connected to one of the optical shutter elements of each of said optical shutter units, wherein each optical shutter element is arranged at a position where said signal electrode and a scanning electrode cross each other so as to be sandwiched by both of said signal and scanning electrodes, a selection signal is sequentially supplied to each of said n scanning electrodes, said optical shutter elements connected to said scanning electrodes supplied with said selection signal transmit a light when a first predetermined potential is applied to said signal electrode corresponding to said optical shutter elements, and said optical shutter elements shut off the light when a second predetermined potential is applied to said signal electrode, and the scanning electrodes to which said selection signal is not supplied become substantially an open state; and resistor means connected between a scanning electrode and an optical shutter element when said selection signal is not supplied to the scanning electrodes.

2. An optical switch array according to claim 1, wherein a resistance value of said resistor means which is connected to said scanning electrode when said selection signal is supplied is smaller than that when the selection signal is not supplied.

3. An optical switch array according to claim 2, wherein said resistor means is a resistive element of which a resistance value varies in dependence on electric field, current, light, magnetic field, or heat.

4. An optical switch array according to claim 3, wherein said resistive element includes a light source and a photo sensor which is made conductive when it receives the light from said light source, and when said selection signal is supplied to said scanning electrodes, the light is irradiated from the light source onto said photo sensor and a resistance value of the photo sensor in this case is smaller than that when the selection signal is not supplied.

5. An optical switch array according to claim 4, wherein said resistive element includes a photo sensor of a planar type using a—Si.

6. An optical switch array according to claim 4, wherein said resistive element is a photo sensor of a sandwich type using a—Si.

7. An optical switch array according to claim 4, wherein said light source is an LED bar light source.

8. An optical switch array according to claim 4, wherein said light source includes a stationary light source and optical shutter means for allowing the light from said stationary light source to flicker synchronously with said selection signal.

9. An optical switch array according to claim 3, wherein said resistive element is a transistor and said transistor is made conductive when the selection signal is supplied to the scanning electrodes.

10. An optical switch array according to claim 9, wherein said transistor is a thin film transistor.

11. An optical switch array according to claim 3, wherein said resistive element is a field effect transistor and said field effect transistor is made conductive when the selection signal is supplied to the scanning electrodes.

12. An optical switch array according to claim 11 wherein said field effect transistor is a thin film field effect transistor.

13. An optical switch array according to claim 1, wherein a predetermined potential is always applied to said scanning electrodes, and said resistor means which is connected to said scanning electrode becomes substantially the open state when the selection signal is not supplied, while said resistor means has a low resistance value when the selection signal is supplied.

14. An optical printer comprising:
a light source;
a time-sharing drive optical switch array including n (n=2, 3, 4, ...) optical shutter elements each having a ferroelectric liquid crystal, a signal electrode which is commonly connected to each of said optical shutter elements of said optical shutter unit, n scanning electrodes which are each connected to said optical shutter units, wherein each optical shutter element is arranged at a position where said signal electrode and a scanning electrode cross each other so as to be sandwiched by both of said signal and scanning electrodes, a selection signal is sequentially supplied to each of said n scanning electrodes, the optical shutter elements which are connected to the scanning electrodes supplied with said selection signal transmit a light when a first predetermined potential is applied to said signal electrode corresponding to said optical shutter elements, and said optical shutter elements shut off the light when a second predetermined potential is applied to said signal electrode, while scanning electrodes to which the selection signal is not supplied become substantially an open state, and resistor means is connected between a scanning electrode and an optical shutter element when said selection signal is not supplied to the scanning electrodes, said optical switch array receiving a light from said light source;

a photoconductive medium member for receiving the light transmitted through said optical switch array for forming an electrostatic latent image on a surface of said photoconductive medium member;

charging means for previously charging said photoconductive medium member before said light is received;

developing means for depositing toner onto the photoconductive medium member on which said electrostatic latent image was formed and for forming a toner image corresponding to the latent image; and fixing means for transferring said toner image onto a recording medium.

* * * * *